(12) United States Patent
Moskun et al.

(10) Patent No.: US 7,592,588 B2
(45) Date of Patent: Sep. 22, 2009

(54) CALIBRATION SOURCE INFRARED ASSEMBLY FOR AN INFRARED DETECTOR

(75) Inventors: Eric M. Moskun, Long Beach, CA (US); Lacy G. Cook, El Segundo, CA (US); Howard M. De Ruyter, Torrance, CA (US)

(73) Assignee: Raytheon Company, Waltham, MA (US)

( * ) Notice: Subject to any disclaimer, the term of this patent is extended or adjusted under 35 U.S.C. 154(b) by 52 days.

(21) Appl. No.: 11/978,738

(22) Filed: Oct. 30, 2007

(65) Prior Publication Data

US 2009/0108201 A1 Apr. 30, 2009

(51) Int. Cl.
*G01D 18/00* (2006.01)
(52) U.S. Cl. ............... 250/252.1; 250/338.1; 356/416; 356/417; 356/418
(58) Field of Classification Search ........................ None
See application file for complete search history.

(56) References Cited

U.S. PATENT DOCUMENTS

| | | | |
|---|---|---|---|
| 4,727,255 A | 2/1988 | Monier et al. ............... 250/352 |
| 4,851,684 A | 7/1989 | Martin et al. ............... 250/352 |
| 4,876,453 A | 10/1989 | Wirick | |
| 5,404,016 A | 4/1995 | Boyd et al. ................. 250/352 |
| 5,587,784 A | 12/1996 | Pines et al. ................. 356/4.01 |
| 7,119,337 B1 | 10/2006 | Johnson et al. | |
| 7,235,054 B2 | 6/2007 | Eckerbom ................... 600/532 |
| 7,238,942 B2 | 7/2007 | Goncalves .................. 250/343 |
| 2003/0174315 A1 | 9/2003 | Byren et al. | |
| 2006/0050277 A1* | 3/2006 | Ok et al. ..................... 356/417 |

OTHER PUBLICATIONS

PCT Notification of Transmittal of the International Search Report and the Written Opinion of the International Searching Authority; Mar. 6, 2009; 12 pgs.

* cited by examiner

*Primary Examiner*—David P Porta
*Assistant Examiner*—Yara B Green
(74) *Attorney, Agent, or Firm*—Pillsbury Winthrop Shaw Pittman LLP (57) ABSTRACT

Provided is a calibration source IR assembly for an IR detector including an IR focal plane. The calibration assembly includes a rotatable spectral filter wheel optically coupled to an IR focal plane of the detector, the filter wheel having a plurality of areas each of at least a minimum size. At least one area being a calibration area, the calibration area including: a substrate having a first side facing the IR focal plane and a second side opposite from the first side; a light transmitting edge section disposed between the first side and the second side; and at least one light redirector disposed at least partially within the substrate, the light redirector structured and arranged to receive light from the edge and to redirect the light out the first side. A light source optically coupled to the edge section. An IR detector including the improvement of such a calibration source IR assembly is also provided.

25 Claims, 5 Drawing Sheets

CALIBRATION SOURCE INFRARED ASSEMBLY FOR AN INFRARED DETECTOR

FIELD

This invention relates generally to the field of infrared detectors, and more specifically to a filter injected calibration flood source for calibration of infrared detectors.

BACKGROUND

Infrared detectors, (such as Dewar detector assemblies) contained within a sealed cryo-vacuum assembly have been known for a number of years. In general, these types of infrared detector assemblies have a modular metal and glass construction and are vacuum sealed. A cold cavity assembly penetrates the vacuum housing in order to extract heat generated from the FPA to maintain a specific temperature. The cold cavity assembly typically provides a transparent glass window at one end and, opposite from the window and exposed to the internal vacuum, an infrared focal plane.

The focal plane is typically an array of tiny pixels, each pixel being operable to generate or pass a current in response to infrared radiation being incident upon the pixel. In most cases the generated or passed current is proportional to the incident infrared energy.

As both small and highly sensitive devices, these pixels are prone to some fluctuation in their response behavior over the life of the infrared detector. Regular calibration is typically highly desired so as to insure uniformity in measurements. It is important to know the relative operation performance of the pixels relative to themselves. An unknown change in performance could lead to erroneous data regarding measurements of an infrared source. As such, calibration is used to correct for pixel to pixel variations, such as a non-uniformity correction, and changes in the pixel response over time.

Typically, the calibration is accomplished by placing a large source at or near the infrared detector aperture. The source injects illumination into the assembly and ideally illuminates the entire focal plane at the same time. Although calibration in a laboratory environment is typically performed before deployment, regular re-calibration after deployment is highly desired for the reasons stated above.

The calibration flood source is therefore typically provided by a mechanical method of switching between looking at the calibration source or the outside world. Frequently this is accomplished by moving a flood source over the entire aperture, which being a large aperture in some detectors requires a large mechanical system and a large illumination source.

Uniformity of the illumination is very important, and with larger light sources the issue of uniformity become increasingly challenging. To reduce the size of the illumination source and avoid the cumbersome external mechanics to move the source over the aperture, alternative configurations have been attempted. One such alternative is to place the illumination source within the cold cavity assembly and close to the focal plane.

At least two issues quickly arise when the illumination source is placed within the cold cavity assembly. First, if the illumination source is placed in front of the focal plane, then it will also shadow at least part of the focal plane. To avoid such a shadowing affect, at least some component of the illumination source must be actuated so as to move out of the way. Second, and perhaps more critical, the presence of the illumination source within the cold cavity presents an additional thermal load to the detector assembly. This additional thermal load provided by the illumination source will likely degrade performance, retard the response time of performance, and require more cooling power.

As infrared detector assemblies of this type are frequently space based devices, a complex calibration system is quite undesirable. Size and weight are ever present factors in the cost of assembly and launch. The greater one component is in terms of size and weight, generally the smaller some other component must be.

Further, the system must also be designed to withstand the forces incurred during launch and deployment and then repeated operation requests without being easily serviceable. There are also a number of existing elements that are highly desired for detector functionality, such as spectral filter wheels and guidance systems. Options to provide calibration without compromising existing systems has proven challenging as well.

Hence, there is a need for a focal plane calibration system that overcomes one or more of the issues and problems identified above.

SUMMARY

This invention provides a filter injected calibration flood source for an infrared detector.

In particular, and by way of example only, according to one embodiment of the present invention, provided is a calibration source IR assembly for an IR detector including an IR focal plane, comprising: a rotatable spectral filter wheel optically coupled to an IR focal plane of the detector, the filter wheel having a plurality of areas each of at least a minimum size; at least one area being a calibration area, the calibration area including: a substrate having a first side facing the IR focal plane and a second side opposite from the first side; a light transmitting edge section disposed between the first side and the second side; and at least one light redirector disposed at least partially within the substrate and adjacent to the first side, the light redirector structured and arranged to receive light from the edge and to redirect the light out the first side; and a light source optically coupled to the edge section.

In yet another embodiment, provided is an IR detector with a calibration source assembly, comprising: a cold cavity assembly tube providing an internal vacuum, the tube having a first end providing a cold stop and a second end providing an IR focal plane oriented towards the first end; a rotatable spectral filter wheel optically coupled to an IR focal plane of the detector but located outside the cryo-vacuum Dewar or cold cavity assembly, the spectral filter wheel having a plurality of areas each of at least a minimum size; at least one such area being a calibration area, the calibration area including: a substrate having a first side facing the IR focal plane and a second side opposite the first side; a light transmitting edge section disposed between the first side and the second side; at least one light redirector disposed at least partially within the substrate, the light redirector structured and arranged to receive light from the edge and to redirect the light out the first side; and a light source optically coupled to the edge section.

Further still in yet another embodiment, in a cryo-vacuum Dewar IR detector assembly providing a focal plane optically coupled to a spectral filter wheel including a plurality of areas each of at least a minimum size, the improvement comprising: at least one area being a calibration area, the calibration area including: a substrate having a first side facing the IR focal plane and a second side opposite from the first side; a light transmitting edge section disposed between the first side and the second side; at least one light redirector disposed at least partially within the substrate and adjacent to the first side, the light redirector structured and arranged to receive light from the edge and to redirect the light out the first side; and a light source optically coupled to the edge section.

DETAILED DESCRIPTION

Before proceeding with the detailed description, it is to be appreciated that the present teaching is by way of example only, not by limitation. The concepts herein are not limited to use or application with a specific system or method for infrared calibration. Thus, although the instrumentalities described herein are for the convenience of explanation, shown and described with respect to exemplary embodiments, it will be appreciated that the principles herein may be applied equally in other types of systems and methods involving infrared calibration for infrared detectors.

Figure 1:
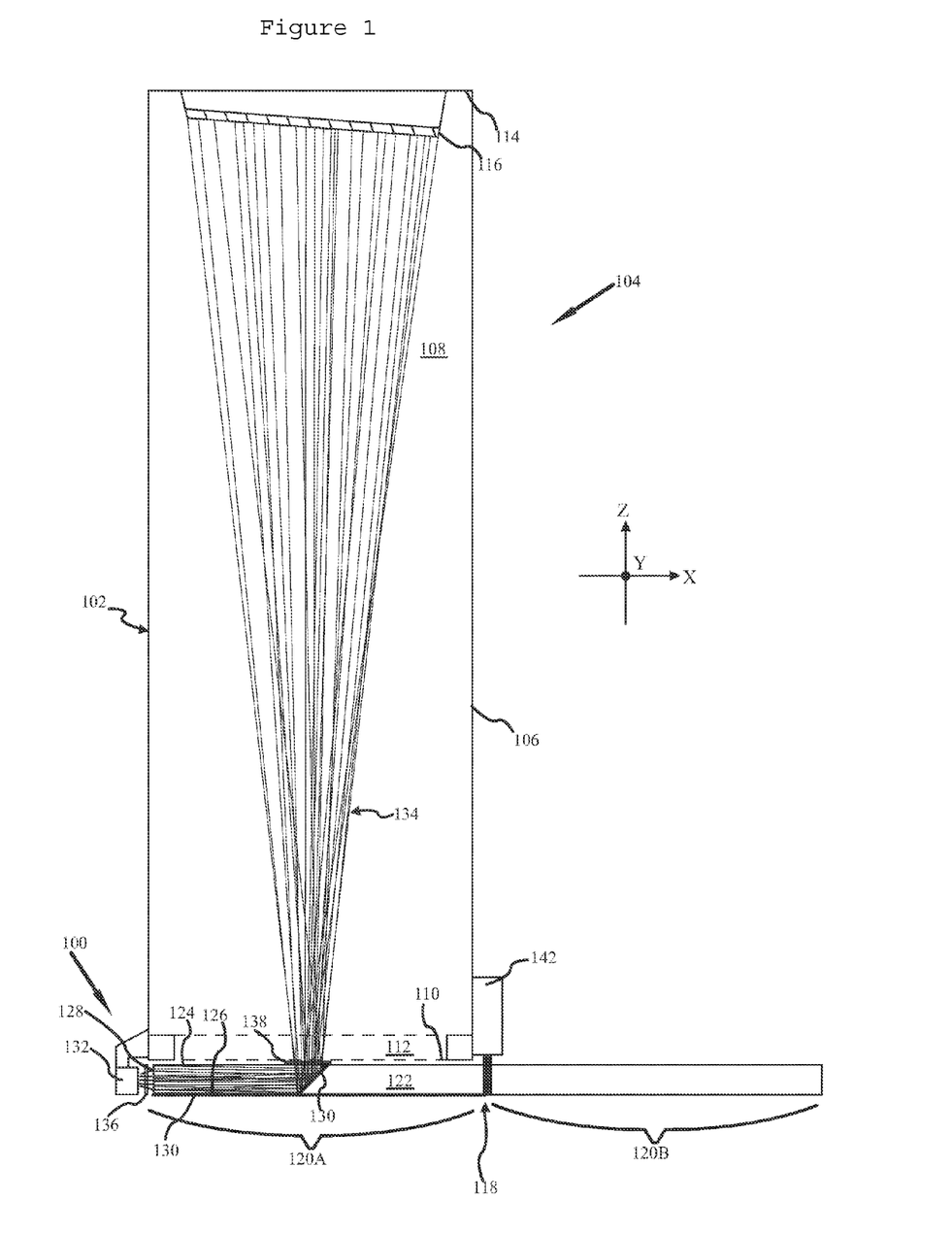
FIG. 1 illustrates an infrared calibration source assembly in connection with an infrared detector, which in accordance with at least one embodiment, provide an infrared detector with calibration source assembly.

Turning now to the figures, and more specifically to FIG. 1, there is shown an infrared calibration source assembly 100 in connection with an infrared detector 102, in accordance with at least one embodiment. As a combined unit, the assembly is an infrared detector with calibration source assembly or "IRDCSA" 104. To facilitate the description, the orientations are referenced to the coordinate system with three axes orthogonal to one another, as shown in FIG. 1. The axes intersect mutually at the origin of the coordinate system which is intended to be the center of the IRDCSA 104. The axes shown in all figures are offset from their actual locations for clarity of illustration. Moreover, FIG. 1 is an IRDCSA 104 as against the XZ-plane.

The IR detector 102 in at least one embodiment consists generally of a cold cavity assembly tube 106 providing an internal vacuum environment 108. The cold cavity assembly tube 106 has a first end 110 providing a cold stop 112 and a second end 114 providing an IR focal plane 116 oriented towards the first end 110. Those skilled in the art will appreciate the cold stop to include, in general, a transparent glass sealed aperture that serves to seal the assembly tube 106 while providing for the passage of light energy for incidence upon the IR focal plane 116. It is also appreciated that the cold stop and the glass seal aperture are not in direct physical contact, as the cold stop serves as a thermal barrier to isolate the internal vacuum environment 108 whereas the glass window is ambient and part of the external vacuum housing.

The infrared calibration source assembly 100 includes a rotatable spectral filter wheel 118, optically coupled to an IR focal plane 116 of the detector 102. The filter wheel 118 has a plurality of areas 120 each of at least a minimum size. In a typical spectral filter wheel, the areas are light transmitting, though in some configurations not all possible areas are used and/or an area may be larger than actually necessary given a limited number of filter areas desired. As shown in FIG. 1, area 120A is a calibration area and area 120B is a spectral band pass filter area. The calibration area 120A includes a substrate 122 having a first side 124 facing the IR focal plane 116 and a second side 126 opposite from the first side 124. A light transmitting edge 128 is disposed between the first side 124 and the second side 126.

At least one light redirector 130 is disposed at least partially within the substrate 122 of calibration area 120A. The light redirector 130 is structured and arranged to receive light from the edge 128 and to redirect the light out the first side 124. A light source 132 is optically coupled to the edge section 128. As shown in FIG. 1, calibration light rays 134 enter the substrate 122 through edge 128 and are redirected by light redirector 130 towards the focal plane 116.

As different light sources provide different degrees of uniformity in their respective light output, in at least one embodiment a diffuser is disposed between the light source 132 and the focal plane 116. As discussed above, it is generally undesirable to place additional elements within the cold cavity assembly tube 106, especially so when such element must be actuated to be either in or out of the light path from cold stop 112 to the focal plane 116.

In at least one embodiment, a diffuser 136 is disposed between the light source 132 and the edge section 128. Moreover, in at least one embodiment the diffuser is coupled upon the edge section 128. In at least one alternative embodiment, the edge section 128 is buffed or otherwise treated so as to impart a diffusing quality as an integral part of the edge section 128.

In at least one alternative embodiment, a diffuser 138 is disposed between the first side 124 and the cold stop 112, and specifically adjacent to the first side 124. Moreover, in at least one embodiment the diffuser is disposed upon the first side 124. In at least one alternative embodiment, the first side 124 is buffed or otherwise treated so as to impart a diffusing quality as an integral part of the first side 124. Further still, in at least one embodiment, regardless of the presence of diffuser 136 or diffuser 138, the light source 132 is an LED light source.

As is further discussed below, in at least one embodiment the second side 126 of the substrate 122 is coated with material 140 so as to be non-light transmissive. Motor 142 is operational under the direction of a control system (not shown) to rotate the spectral filter wheel 118 so as to move the calibration area 120 into alignment for calibration purposes or provide another area of the filter wheel for spectral band pass filtering or no filtering if desired.

To summarize, in at least one embodiment, provided is an IRDCSA 104. IRDCSA 104 includes a cold cavity assembly tube with an internal vacuum environment 108, a focal plane 116 at a first end 110 oriented towards a cold stop 112 providing a light transmissive aperture into the vacuum environment 108 and optically coupled to the focal plane 116. A rotatable spectral filter wheel 118 is disposed adjacent but external to the cold stop 112 and can be rotated to align areas to the cold stop 112. At least one area of the filter wheel is a calibration area 120A. The calibration area includes a substrate 122 having a first side 124 and opposite thereto a second side 126 and an edge section 128 there between. The second side is treated with a material 140, which in at least one embodiment is black material. At least one light redirector is disposed at least partially within the substrate. The light redirector 130 is oriented so as to receive calibration light rays 134 provided from a light source 132 optically coupled to the edge section 128 and redirect the calibration light through the first side 124 so as to be incident upon the focal plane 116.

Figure 2:
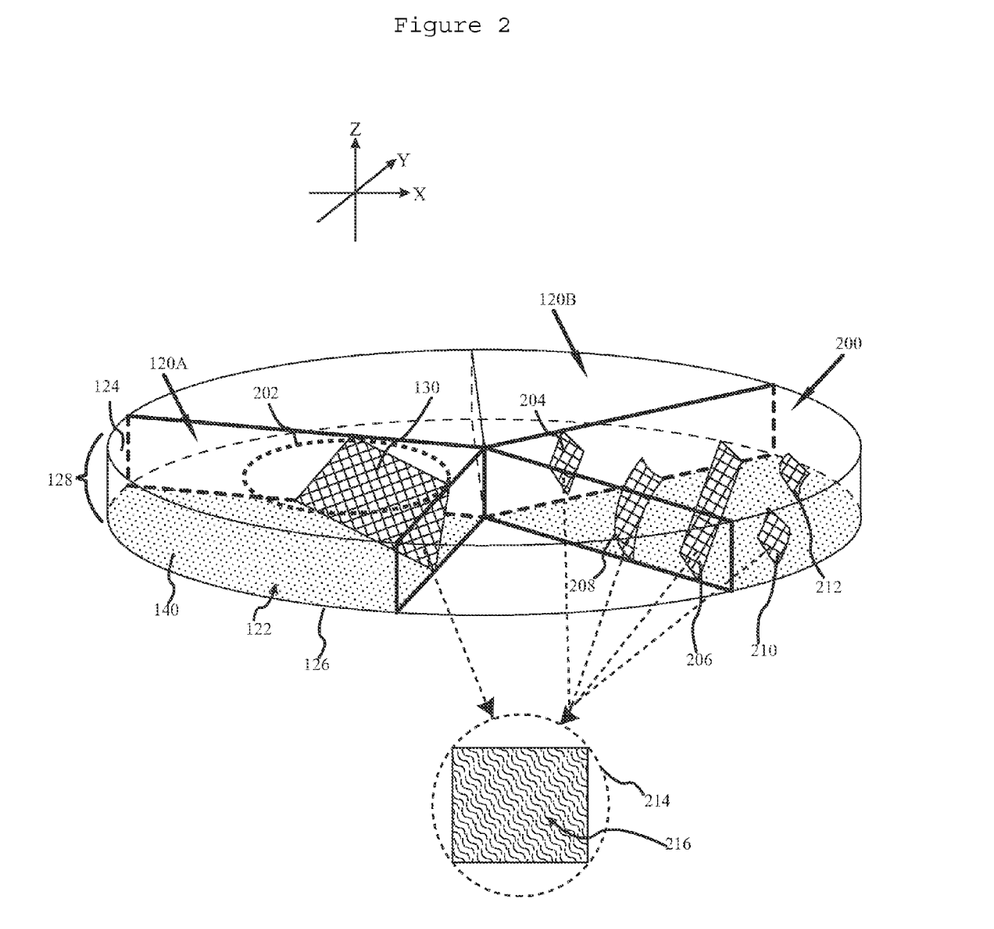
FIG. 2 is a perspective view of the filter wheel shown in FIG. 1 in accordance with at least one embodiment.

FIG. 2 provides a perspective view of the rotatable filter wheel 118 further illustrating calibration area 120A, and alternative calibration area 200. It is understood and appreciated that most configurations of IRDCSA 104 will provide only one calibration area, however two alternative versions are provided in FIG. 2 for the sake of comparison and discussion.

Most military and a growing number of commercial infrared detection systems utilize a spectral filter wheel mechanism to allow the sensors to image in multiple separate wavelength ranges. The addition of a calibration area, such as calibration area 120A or calibration area 200 advantageously provides reliable calibration while capitalizing on existing, known and proven mechanical systems.

Traditionally a spectral filter wheel 118 has multiple positions, each with a band pass filter or no filter. As is shown in FIG. 2, in general each area of the filter wheel has at least a minimum size so that it covers the entire aperture of the cold stop, represented by dotted line 202. With the present invention, a band pass filter area or unused area is replaced with the calibration area, e.g., calibration area 120A.

As is appreciated in FIG. 2, the second side 126 is coated with a material 140 such that second side 126 is non-light transmissive, and specifically not transmissive to IR light. In at least one embodiment this is accomplished by coating second side 126 with a black material 140. By rendering second side 126 non-light transmissive, stray IR light which might otherwise be incident upon second side 126 from opposite the cold stop 112 is eliminated. As such, IR light provided for calibration purposes is advantageously limited to the light source 132 (see FIGS. 1 and 4).

Moreover, IRDCSA 104 permits calibration to be performed at any time and when the detector is in any orientation. In other words the IR detector can be oriented towards an IR source from which a measurement is desired. Whether actually oriented at that source, while in motion towards those coordinates, or oriented towards any other IR source, any and all incident IR light is blocked and therefore will not interfere with the calibration operation. As the blocking for calibration can indeed be performed when actually oriented towards the desired source, the time delay between calibration and actual measurement is minimal, therefore permitting greater confidence in the desired source IR measurement.

Disposed within substrate 122 of calibration area 120A is at least one light redirector 130. As illustrated, light redirector 130 extends from the first side 124 to the second side 126, and appears generally flat. Light redirector is sized and appropriately positioned to receive calibration light provided through the edge 128 and redirect the calibration light through the first side 124 such that it is incident upon the focal plane 116.

In an alternative embodiment, within the substrate 122 of calibration area 200 there are a plurality of light redirectors of which light redirectors 204, 206, 208, 210 and 212 are exemplary. The use of a plurality of light redirectors may be desired in some embodiments, such as for example where the diffuser 138 proximate to the first side 124 is not provided, so as to provide a uniform scattering of the calibration light rays 134 across the focal plane 116.

Light redirectors 204 and 206 are both generally flat, whereas light redirectors 208, 210 and 212 are shaped, as in curved. Whether as one element or a plurality of elements, in at least one embodiment, each light redirector is light reflective in that each is either coated with a light-reflective material or established from a light-reflective material, such as, but not limited to, gold, silver or aluminum. In either case, the light-reflective material is sufficiently thick so as to not be light transmissive. In an embodiment utilizing silver, the thickness of the silver material may be about one-thousand angstroms thick.

As illustrated within the enlarged dotted circle 214, in at least one embodiment each light redirector, e.g., light redirector 130 has a textured surface 216. Such texturing may be achieved by scuffing, sanding, buffing, machining or such other process as may be employed to impart a texture upon the surface of the light redirector. Such texturing may be described as fine, in that the surface appears generally flat to the eye, or rough in that the surface is visually perceived to be uneven, consisting of, for example, bumps and dimples.

While bumps, dimples or other surface features may be considered part of a textured surface as well, it is to be appreciated that there are differences in scale such that the features of the texture surface 216 clearly define the overall shape of the light redirector on a larger scale. In addition, it is understood and appreciated that such bumps, dimples or other surface features whether of a fine scale or rough scale may be randomly distributed across the light redirector, or specifically patterned. Further, the features of the textured surface may be of varying size and orientation, and may in certain embodiments overlap. In at least one embodiment the size of the bumps, dimples and or other surface features is generally between about one and one hundred microns. Moreover, the intention of the texture of the surface of the light redirector is to further scatter, and therefore diffuse the calibration light so as to further insure uniform and consistent calibration of the focal plane 116.

In at least one embodiment, the light redirector(s), such as 208, 210 and 212 are elliptical mirror segments having curved cross sections with respect to both Z and Y axis. In at least one alternative embodiment, the light redirectors(s) are cylindrical mirror segments, having curved cross sections with respect to the Y axis, and straight sides.

Further, in at least one embodiment having a plurality of light redirectors, the light redirectors within the calibration area 200 are substantially identical. In yet another alternative embodiment the light redirectors within the calibration area 200 are different from one to another, such as for example a mixture of elliptical and cylindrical mirror segments, and or even a mixture of different sized elliptical and/or cylindrical mirror segments.

Figure 3:
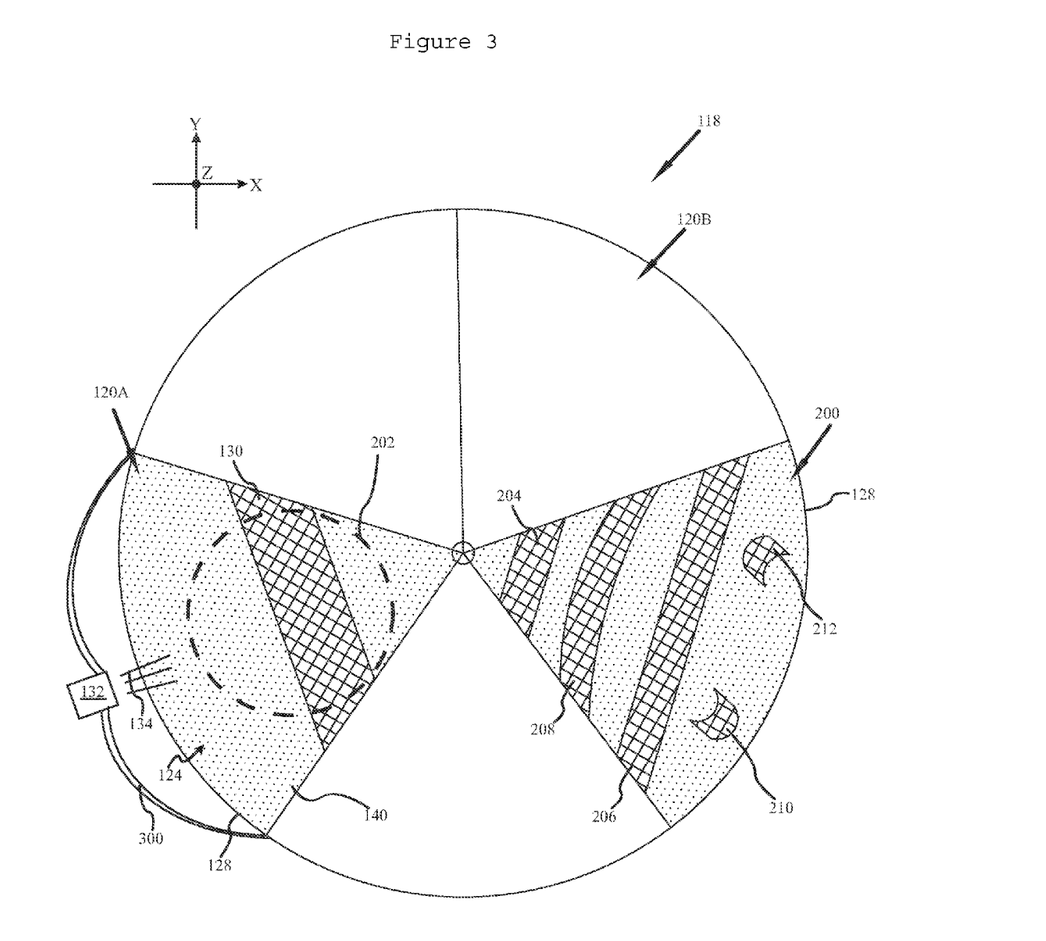
FIG. 3 is a top view of the filter wheel shown in FIG. 2 in accordance with at least one embodiment.

FIG. 3 is a plane view of the example spectral filter wheel 118 shown in FIG. 2, now against the YX plane. Superimposed on calibration area 120A is the outline of the cold stop 112 aperture 202. As illustrated, when the calibration area 120A is positioned for a calibration operation, the calibration section 120 occupies all of the field of view provided by cold stop 112 aperture 202.

As shown, the calibration light source 132 is disposed proximate to the edge of the spectral filter wheel 118, such that when the wheel is rotated to align the calibration area 120A to the cold stop, the calibration light source 132 is optically coupled to the edge section. To avoid the introduction of stray light energy, in at least one embodiment, the calibration light source is fitted with a light shield 300 that insures that only light provided from the calibration source is provided to the edge section 128. Shield 300 is omitted in FIG. 1 and FIG. 4 as the side view orientation would obscure the calibration light source 132, calibration light 134 and optional diffuser 136 if shown.

In addition, as the second side 126 is coated with a black material, it is also apparent that when the calibration source is not activated, the focal plane will receive no incident IR calibration light. As such, calibration area 120A provides both a "hot" calibration—when the calibration light source is activated, and a reference "cold" calibration—when the calibration light source is not activated.

As the calibration source is not located within the cold cavity, there is no heat contamination which must otherwise dissipate between hot and cold states. Further, as there is no active movement required to switch between the hot and cold states, the calibration process may flip rapidly from hot to cold and vis-a-versa so as to also test and calibrate the response time of the pixels comprising the focal plane.

Figure 4:
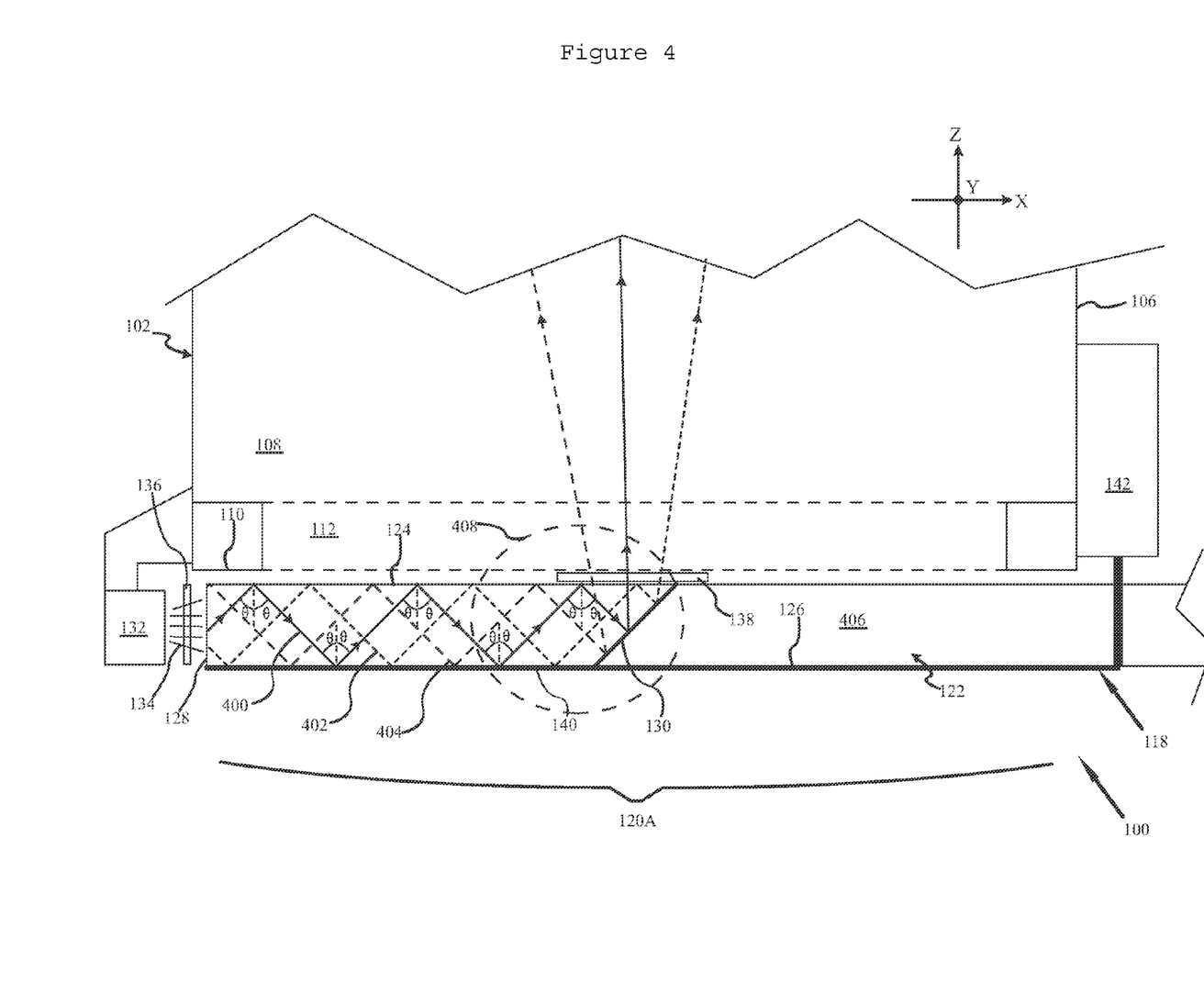
FIG. 4 is an enlarged cross section view portion of FIG. 1 in accordance with at least one embodiment.

FIG. 4 is an enlarged partial cross section of the IRDCSA 104 as shown in FIG. 1. In at least one embodiment, the substrate 122 is formed of a material so as to provide total internal reflection, or TIR, for light injected through edge section 128. More specifically, light illustrated as light rays 400, 402 and 404 received at the edge section 128 is propagated through the core 406 of the substantially and delivered to the light redirector 130 with minimal loss.

Total internal reflection, or TIR, is the reflection of all incident light off a boundary between the core 406 and the first side 124 and the second side 126. To enhance this boundary, the first and second sides 124, 126 may be treated with a cladding material (such as black material 140 as applied to the second side 126) so as to have an index of refraction lower then that of the core 406. TIR occurs when a light ray is both in a medium of higher index of refraction and approaches a medium of lower index of refraction, and the angle of incidence for the light ray is greater than the "critical angle."

The critical angle is defined as a the angle of incidence measured with respect to a line normal to the boundary between the two optical media for which light is refracted at an exit angle of 90 degrees—that is, the light propagates along the boundary—when the light impinges on the boundary from the side of the medium of higher index of refraction. For any angle of incidence greater than the critical angle, the light traveling through the medium with a higher index of refraction) will undergo total internal refraction. The value of the critical angle depends upon the combination of materials present on each side of the boundary.

As shown in FIG. 4, light ray 400 is traveling through successive TIR bounces. The angle of incidence and refraction remains unchanged at angle $\theta$ until the light redirector 130 is encountered.

Figure 5:
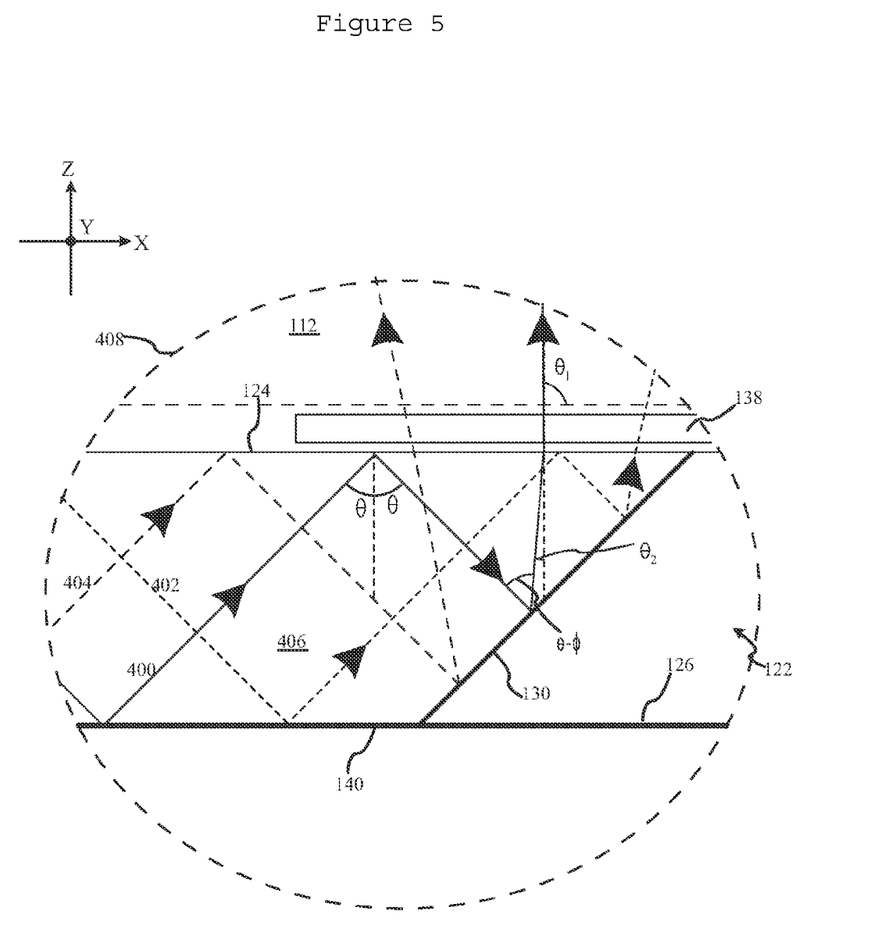
FIG. 5 is an enlarged section of FIG. 4 further illustrating the total internal reflection properties of the infrared calibration source assembly in accordance with at least one embodiment.

FIG. 5 is an enlarged portion of calibration area 120A, indicated by dotted line 408, provided to further illustrate the possible propagation of a light rays and specifically light ray 400. Light ray 400 travels in core 406 through successive TIR, as shown in FIGS. 4 and 5. The angle of incidence and reflection remains unchanged at angle $\theta$. When the light ray 400 encounters light redirector 130, the incident angle decreases by $\Phi$ such that the incident angle becomes $\theta_2=\theta-x\Phi$ (see FIG. 5). As $\theta_2$ is less than the critical angle, light ray 400 exits the core 406 at an angle $\theta_1$, where $\theta_1$ is defined by the following equations, wherein $n_2$ is the index of refraction of the core and $n_1$ is the index of refraction for the first side 124:

$n_2 > n_1$ $\theta_2 < \theta_1$ $n_2 \sin \theta_2 = n_1 \sin \theta_1$

As is illustrated by exemplary light rays 400, 402 and 404, the TIR properties of substrate 122 act to diffuse the calibration light rays by intermixing them so as to provide a greater homogeneity to the calibration light rays as a whole. With respect to the calibration operation, it is understood and appreciated that in at least one embodiment, the radiant power of the calibration source is not of significance. Rather, it is the uniformity of the calibration IR illumination upon the focal plane and the comparison of a current calibration operation to a past operation that is significant. As the source is the calibration light source, which is the same source in all tests for the IRDCSA 104, it is the relative change, if any, from one test to the next for each pixel that is of paramount concern.

In at least one alternative embodiment, the substrate 122 is substantially thin, and serves primarily as a base anchor point for light redirector 130. In such an embodiment the calibration light rays 134 are provided over the small edge 128 and therefore the majority of calibration light rays 134 reach light redirector 130 without experiencing TIR within the substrate 122. Such an alternative embodiment may have the advantage of less weight then the embodiment as illustrated which in certain embodiments may be a desirable tradeoff for the lack of TIR to at least partially homogenize the calibration light rays 134.

With respect to the above description and accompanying figure illustrations, it is appreciated that in at least one embodiment, provided is a Dewar IR detector having a focal plane 116 optically coupled to a spectral filter wheel 118 having a plurality of areas 120 each of at least a minimum size. The Dewar IR detector further includes the improvement of an infrared calibration source assembly 100 as shown and described above.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A calibration source IR assembly for an IR detector including an IR focal plane, comprising:
    a rotatable spectral filter wheel optically coupled to an IR focal plane of the detector, the filter wheel having a plurality of areas each of at least a minimum size;
    at least one area being a calibration area, the calibration area including:
        a substrate having a first side facing the IR focal plane and a second side opposite from the first side;
        a light transmitting edge section disposed between the first side and the second side; and
        at least one light redirector disposed at least partially within the substrate, the light redirector structured and arranged to receive light from the edge and to redirect the light out the first side; and
    a light source optically coupled to the edge section.

2. The calibration source IR assembly of claim 1, further including a diffuser disposed between the light source and the edge section.

3. The calibration source IR assembly of claim 2, wherein the diffuser is coupled to the edge section.

4. The calibration source IR assembly of claim 1, further including a diffuser disposed adjacent to the first side.

5. The calibration source IR assembly of claim 1, wherein the substrate provides total internal reflection for light presented to the edge section, the total internal reflection intermixing the source illumination to provide illumination uniformity.

6. The calibration source IR assembly of claim 1, wherein the at least one light redirector is a mirror.

7. The calibration source IR assembly of claim 1, wherein the at least one light redirector has a textured reflective surface.

8. The calibration source IR assembly of claim 1, wherein the at least one light redirector has a curved reflective surface.

9. The calibration source IR assembly of claim 1, wherein the second side of the substrate is black.

10. The calibration source IR assembly of claim 1, wherein the light source is an LED light source.

11. The calibration source IR assembly of claim 1, wherein all light incident upon the focal plane is restricted to passage through the filter wheel.

12. An IR detector with a calibration source assembly, comprising:
   a cold cavity assembly tube providing an internal vacuum, the tube having a first end providing a cold stop and a second end providing an IR focal plane oriented towards the first end;
   a rotatable spectral filter wheel optically coupled to an IR focal plane of the detector, the filter wheel having a plurality of areas each of at least a minimum size;
   at least one area being a calibration area, the calibration area including:
      a substrate having a first side facing the IR focal plane and a second side opposite the first side;
      a light transmitting edge section disposed between the first side and the second side; and
      at least one light redirector disposed at least partially within the substrate, the light redirector structured and arranged to receive light from the edge and to redirect the light out the first side; and
   a light source optically coupled to the edge section.

13. The IR detector assembly of claim 12, wherein the light source is disposed outside the cold cavity assembly.

14. The IR detector assembly of claim 12, further including a diffuser disposed between the light source and the edge section.

15. The IR detector assembly of claim 12, further including a diffuser disposed adjacent to the first side.

16. The IR detector assembly of claim 12, wherein the second side of the substrate is black.

17. The IR detector assembly of claim 12, wherein the at least one light redirector has a textured reflective surface.

18. The IR detector assembly of claim 12, wherein the at least one light redirector has a curved reflective surface.

19. In a Dewar IR detector providing a focal plane optically coupled to a spectral filter wheel including a plurality of areas each of at least a minimum size, the improvement comprising:
   at least one area being a calibration area, the calibration area including:
      a substrate having a first side facing the IR focal plane and a second side opposite from the first side;
      a light transmitting edge section disposed between the first side and the second side; and
      at least one light redirector disposed at least partially within the substrate and adjacent to the first side, the light redirector structured and arranged to receive light from the edge and to redirect the light out the first side; and
   a light source optically coupled to the edge section.

20. The Dewar detector assembly improvement of claim 19, further including a diffuser disposed between the light source and the edge section.

21. The Dewar detector assembly improvement of claim 19, further including a diffuser disposed adjacent to the first side.

22. The Dewar detector assembly improvement of claim 19, wherein the substrate provides total internal reflection for light presented to the edge section, the total internal reflection intermixing the source illumination to provide illumination uniformity.

23. The Dewar detector assembly improvement of claim 19, wherein the at least one light redirector has a textured reflective surface.

24. The Dewar detector assembly improvement of claim 19, wherein the at least one light redirector has a curved reflective surface.

25. The Dewar detector assembly improvement of claim 19, wherein the second side of the substrate is black.

* * * * *